J. DIEHL & W. WILSON.
CIDER MILL.
No. 32,988. Patented Aug. 6, 1861.
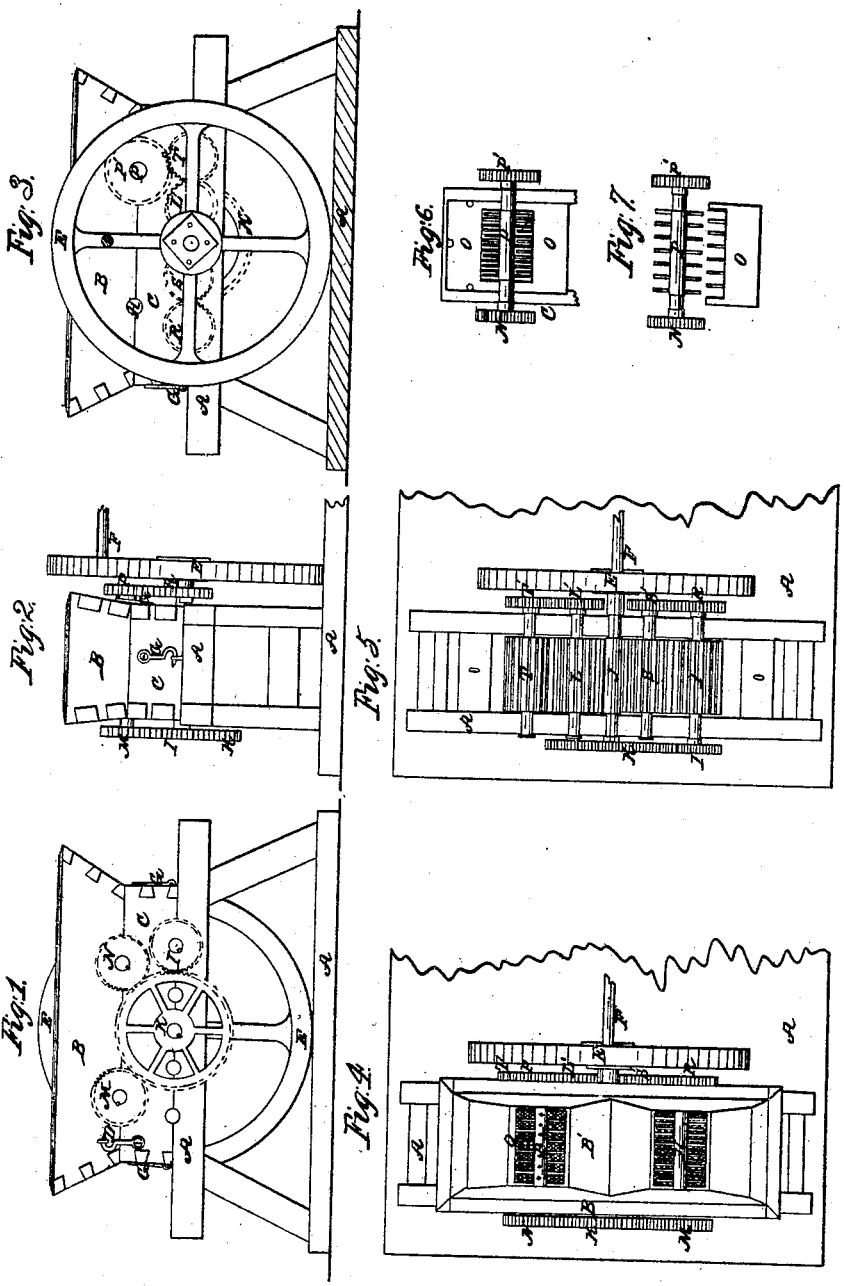

UNITED STATES PATENT OFFICE.

JACOB DIEHL AND WM. WILSON, OF BROOKLYN, OHIO.

CIDER-MILL.

Specification of Letters Patent No. 32,988, dated August 6, 1861.

*To all whom it may concern:*

Be it known that we, J. DIEHL and WM. WILSON, of Brooklyn, in the county of Cuyahoga and State of Ohio, have invented new and useful Improvements in Cider-Mills; and we do hereby declare that the following is a full and complete description of the construction and operation of the same, reference being had to the accompanying drawings, making a part of this specification, in which—

Figure 1, is a side elevation, Fig. 2, is an end elevation, Fig. 3, is an elevation of the opposite side, from that shown in Fig. 1. Fig. 4, is a view of the top. Fig. 5, is a view of the top with the hopper removed. Figs. 6, and 7, are detached sections.

The same letters denote corresponding parts in the different views.

The nature of our improvement relates to a mill, in which the apples are cut up by means of stationary, and radial revolving cutters, operated by gearing after which they are crushed between corrugated rollers, operated in the same way.

In the figures A, represents the frame of the mill, which may be of any suitable form.

B, is the hopper placed on the box C, and retained there by a hook similar to D, on each side, or by any other suitable means. This hopper is divided into two parts, by the frame B′, Fig. 4, both sides of which are inclined toward the cutters. The ends of the hopper are likewise inclined in the same way, so as to keep the apples in direct contact with the cutters.

E, is the driving wheel turned by the crank F, that operates the gearing connected with the cutters and rollers. J, Fig. 5, is the shaft of this wheel, that is supported by the frame of the machine, and revolves the gear wheel K, on the other end. This gear wheel works in the pinions M, and N, Figs. 1, and 4, by means of which the shafts H, and P, to which the cutters are attached, revolve. The stationary cutters O, are firmly secured to the top of the box C, and are similar in shape and size to the revolving blades or cutters H, P, that pass directly between them, as is more clearly shown in the detached section, Fig. 6, O, representing the stationary cutters placed toward each other, so that the blades extend nearly to the shaft P. One of these cutters detached from the box, is represented at O, Fig. 7, and P, is the revolving cutter detached, the blades of which are secured to the shaft directly opposite each other. The blades of the cutter P, move in the spaces between the blades of the cutter O.

The box C, that supports the hopper and cutters, is placed on the frame A, over the rollers, and is kept firmly in place by pins underneath, and a hook G, on each end. In Fig. 5, this box is removed to show the arrangement of the grooved rollers, which are four in number, two on each side of the shaft J, supported by the frame A, and placed under the cutters, revolving close to each other. The roller I, is revolved by means of the pinion I′, on the end of its shaft operating in the gear wheel K. The roller S, is revolved by the pinion S′, working in the pinion R, on the end of the shaft of the roller I. The roller T, is revolved by the pinion T′, on the end of its shaft, working in the pinion P′, on the end of the shaft of the revolving cutter P; and the pinion T′, in turn operates the pinion L′, that revolves the roller L. In this way, the power being applied to the driving wheel, all the cutters and rollers are simultaneously put into operation.

In practical use, the apples are thrown into the hopper, on the cutters and the cutters as they revolve cut the apples up, and force them through the spaces between the blades, into the box C, where they fall on the corrugated rollers, and are crushed up, ready for pressing. In this way the apples being first cut up finely, they are moved readily and effectually crushed for the purpose of pressing out the cider, than in the ordinary mills.

What we claim as our improvement and desire to secure by Letters Patent, is—

The special arrangement of the radial revolving cutters P, H, in connection with the stationary cutters O, in combination with the fluted rollers L, S, T, I, as herein set forth and described, for the purpose specified.

JACOB DIEHL.
WM. WILSON.

Witnesses:
W. H. BURRIDGE,
HENRY NOTH.